United States Patent Office 2,868,225
Patented Jan. 13, 1959

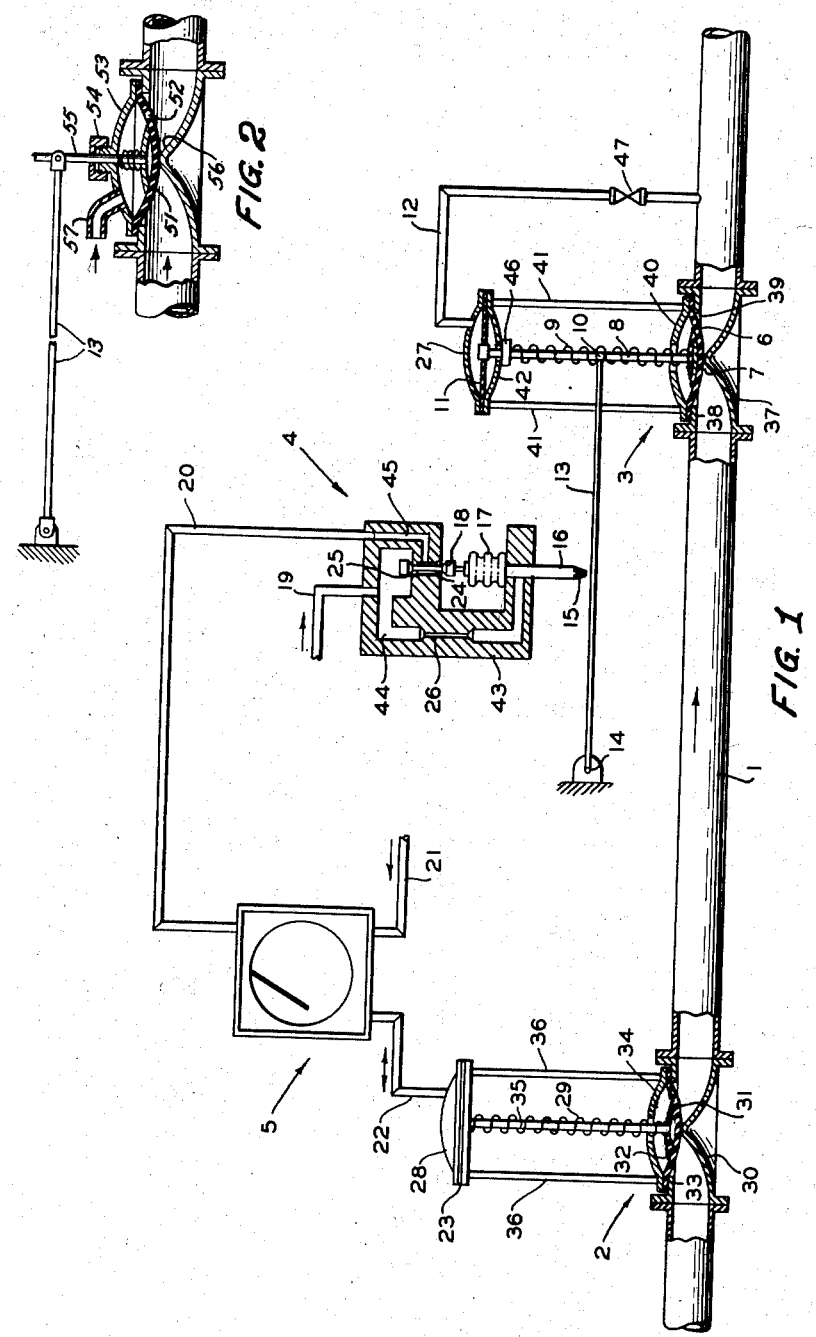

2,868,225

FLUID FLOW SENSING AND CONTROL APPARATUS

William E. Wigham, Floyd Lane, and Alva R. Wilson, Borger, Tex., assignors to Phillips Petroleum Company, a corporation of Delaware Application January 4, 1954, Serial No. 401,839

4 Claims. (Cl. 137—503)

This invention relates to apparatus and a method for control of flow of fluid. In one aspect it relates to apparatus and a method for the control of flow of heterogeneous fluids in pipes where lumpy material suspended in the fluid does not plug the flow sensing element or the flow control valve. In another aspect it relates to apparatus and a method for the control of flow of latex containing lumpy polymer in suspension in pipes wherein the lumpy polymer does not plug the flow sensing element or the flow control valve.

An object of our invention is to provide an apparatus for controlling the flow of fluids in pipes.

Another object of our invention is to provide an apparatus for the control of flow of a heterogeneous fluid in a pipe wherein lumpy material suspended in the fluid does not plug a flow control valve.

Another object of our invention is to provide an apparatus for the control of the flow of latex containing solid polymer material in pipes wherein the lumpy material suspended in the fluid does not plug the flow control valves.

Still another object of our invention is to provide such an apparatus which is positive in its action, relatively inexpensive to manufacture, and simple to install and to operate.

Still other objects and advantages of our invention will be obvious to those skilled in the art upon reading the following specification and drawing, which respectively describes and illustrates a preferred embodiment of our invention.

Figure 1 of the drawing illustrates in diagrammatic form and with parts broken away, a form of the apparatus of our invention.

Figure 2 illustrates another embodiment of our invention.

Referring now to the drawing, reference numeral 1 identifies a conduit or pipe in which is transmitted a fluid the rate of flow of which is to be regulated. Reference numeral 2 identifies a diaphragm operated diaphragm motor valve. Reference numeral 3 identifies a fluid flow sensing apparatus, while reference numerals 4 and 5 identify respectively an air relay and a recorder-controller mechanism.

The diaphragm operated diaphragm motor valve assembly 2 comprises a valve body 30 having as a valve seat 31 a raised portion of the valve body. This raised valve seat is a common type of valve seat in diaphragm valves. Disposed as shown is a resilient diaphragm 32 resting upon shoulders 33. A diaphragm cover or bonnet element 34 is disposed as shown to hold the diaphragm rigidly in place. Attached to the diaphragm is a valve stem 35. This valve stem is attached to the diaphragm 32 so that the valve stem can pull the diaphragm away from the valve seat 31 as well as push it against its seat. This valve assembly is spring loaded with a tension spring 29 in such a manner that the spring tends to bias the valve in an open position. Attached to the end of the valve stem 35 opposite the valve 32 is a flexible motor diaphragm 23. Covering the top of this diaphragm is a motor housing 28 to which is connected a tube 22 as shown. Support elements 36 support the motor diaphragm and housing relative to the valve body, as shown.

The fluid flow sensing apparatus 3 consists of a diaphragm type valve body 37 similar to valve body 30. This valve body 37 is provided with a raised valve seat 7. A flexible diaphragm 6 of resilient material is disposed to cover an opening 39 in the top of the valve body 37, as shown. Holding the resilient diaphragm 6 rigidly in place against shoulders 38 is a bonnet member 40. Support elements 41 are attached to this bonnet member 40 to hold the upper portion of this assembly rigidly in place. The upper portion of this assembly includes a resilient diaphragm member 11 which is tightly attached to the upper end of a movable member 8. This movable member 8 is substantially a valve stem but it does not serve the purpose of a valve stem and accordingly throughout this specification and claims this member will be termed a movable member. This movable member 8 is attached at its bottom end to the resilient diaphragm member 6 and at its upper end to the resilient diaphragm member 11. This resilient diaphragm member 11 is covered by a housing element 27. Surrounding the movable member 8 is a compression spring 9 which controls operation of the flow control valve 2. This compression spring 9 rests at its upper end against support element 42. This support element 42 may however be a housing member similar to housing member 27 with the exception that an opening is provided in its center for accommodation of the movable member 8. This opening in element 42 or housing as it may be termed, is sufficiently small to provide as an effective seat against which stop member 46 rests. A tube 12 is connected to an opening in housing 27 and its other end is connected with conduit 1 at a point on the downstream side of the fluid sensing element 3. In this apparatus fluid is intended to flow through conduit 1 from left to right as indicated by the directional arrow. Tube 12 is provided with a manually operable valve 47.

A baffle member 13 is attached at one end to the movable member 8 by a pivot 10 and is supported at the other end by a support pivot 14. The air relay apparatus 4 is disposed as illustrated in such a manner that a bleed orifice 15 on the lower end of tube 16 is positioned adjacent the baffle member 13 so that upon vertical movement of member 8 the flow of air from the bleed orifice 15 is regulated by the baffle 13. The tube 16 extends through a portion of a body 43 of the relay 4. To the upper end of tube 16 is attached a bellows 17 which expands and contracts respectively upon increase and decrease of air pressure therein. Communicating with the tube 16 within housing 43 is a conduit 44 having an orifice or restricted section 26. A tube 19 is connected at one end with the conduit 44 in the body member 43 and at its other end to a source of air under pressure. Disposed rigidly to the top of the bellows 17 is an air relay valve 18 which is adapted to seat against a lower valve seat 24 upon expansion of the bellows and to seat against an upper valve seat 25 upon contraction of the bellows 17. A tube 20 is connected at one end to a conduit 45 within the body 43 and at its other end to the controller apparatus 5. The conduit 45 accordingly communicates with the end of tube 20 and with an annular space within the relay housing 43 intermediate the ends of the relay valve 18.

Tube 21 is attached at one end to the controller apparatus 5 and at its other end to a source of air, not shown. The controller assembly 5 is a recording controller or an indicating controller, as desired. This controller is intended to regulate the flow of air from tube 21 to tube 22 in response to air pressure from tube 20. Regulators or controllers, such as apparatus 5, are standard equipment and can be obtained from instrument supply houses and accordingly detailed construction of this controller will not be described. Since tube 22 transmits air pressure from controller 5 to the upper side of the diaphragm 23 an increase of pressure on the diaphragm 23 pushes the valve stem and the diaphragm 32 downward, the lower end of this movement being reached when the diaphragm is tightly against the valve seat 31. When the controller 5 operates to vent air pressure from tube 22 and the upper side of the diaphragm 23 the tension spring 29 pulls the valve stem 35 and the diaphragm 32 upwards to open this valve to the flow of fluid.

The flow control apparatus of our invention is adapted to control the flow of fluids including gas as well as liquids. It is especially adapted to control the flow of such liquids as latex in which chunks of polymer material are frequently suspended. Such solid material ordinarily plugs flow control apparatus of the prior art. We have found that by using a diaphragm valve for valve assembly 2, as illustrated in the drawing, and certain elements of a diaphragm valve in the fluid flow sensing apparatus 3 that the flow of such materials as latex containing solid polymer can be controlled or regulated without plugging the flow control valve. We have further found that our apparatus operates in such a manner that chunks of solid polymer which normally plug valves work their way through the flow control valve when the latter is used in conjunction with our sensing apparatus.

In the operation of the apparatus of our invention the sensing assembly 3 is adjusted to allow a predetermined rate of flow of fluid by adjusting the compression spring 9 which controls operation of the flow control valve 2. In fluid flow through the diaphragm type valve body 37 which serves as a constriction, pressure downstream of this valve body is lower than the pressure upstream thereof. The tube 12 is provided in order that the effect of downstream pressure, acting on diaphragm 6 in the same direction as the upstream pressure, is eliminated. This point is clearly shown by action of downstream pressure through tube 12 on diaphragm 11, i. e., on twice the area, and in opposition to the downstream pressure acting on half the underside of diaphragm 6. The net result is that the movable member 8 and the motor valve 2 are truly subject to a differential pressure. In this manner the position of the diaphragm 6 is determined primarily by the rate of flow. The area of the diaphragm 11 exposed to pressure from tube 12 is intended to be the same as the effective area of the underside of diaphragm 6 so that under static pressure conditions in the absence of spring 9 the diaphragm assembly is just in balance. With compression spring 9, the degree of compression exerted against the upper surface of diaphragm 6 is just sufficient that the pressure differential exerted during fluid flow between the upstream and downstream sides of diaphragm 6 can raise the movable member 8 and this movement is intended to be proportional to the pressure drop through the valve body 37. With the compression spring 9 properly adjusted or selected for the flow of fluid at a predetermined rate and with the motor valve 2 being set to permit flow of fluid at said predetermined rate when the flow of fluid through the valve body 37 increases, the pressure exerted against the upstream surface of diaphragm 6 increases more than the pressure on the downstream surface and the movable member 8 moves upward. This upward movement is transmitted at pivot point 10 to the baffle member 13 and the baffle member is then moved nearer the bleed orifice 15 and restricts air flow therethrough. Air pressure in tube 16 builds up and the bellows 17 expands and pushes the relay valve 18 upward and as the lower conical portion of relay valve 18 approaches seat 24 air flow therebetween is also restricted and the upper conical or beveled surface of relay valve 18 is moved further away from the upper seat 25 which movement permits air under pressure from the air inlet tube 19 to enter tube 20. As air pressure in tube 20 increases the controller apparatus 5 operates to increase air pressure in tube 22 which pressure increase is transmitted to the upper side of diaphragm 23 thereby forcing diaphragm 32 downward which movement restricts flow of fluid through the motor valve. When the motor valve partly closes and restricts flow of fluid the pressure differential across the sensing valve body 37 decreases and the compression spring 9 operates to move the movable member 8 downward which movement moves baffle 13 further away from the bleed orifice 15 to increase the air bleeding. Thus a decrease of air pressure in tube 16 occurs followed by a contraction of bellows 17 which contraction moves relay valve 18 downward to restrict air flow from tube 19 to tube 20 and a diminution of air pressure in tube 20 causes controller apparatus 5 to decrease air pressure in tube 22 which allows the tension spring 29 in motor valve 2 to move diaphragm 32 further away from valve seat 31. In this manner the rate of fluid flow is increased in conduit 1. This operation occurs until such time that the rate of fluid flow in conduit 1 through motor valve 2 just balances the adjusted compression in compression spring 9. Under this condition fluid flow through conduit 1 is uniform.

If, however, when transmitting such a liquid as latex containing chunks of solid polymer through conduit 1, lumps of polymer may be lodged on the upstream side of the valve seat 31 and restrict or completely plug off fluid flow through this valve. Under this condition the pressure differential across valve body 37 decreases and a decrease in differential allows compression spring 9 to move the movable member 8 downward thereby increasing air bleeding through orifice 15. The air pressure in bellows 17 is decreased and the contraction of bellows 17 lowers relay valve 18 to decrease the air pressure in tube 20 and the controller 5 decreases the air pressure above diaphragm 23 and tension spring 29 raises the valve diaphragm 32 to open this valve. If the chunks of polymer plugging this valve are not very large the degree of opening of the valve diaphragm may allow the polymer chunks to pass and as flow increases the pressure differential across the valve body 37 increases and the sensing apparatus 3 operates in a manner hereinbefore described to throttle the valve. If, however, the opening afforded valve diaphragm 32 was not sufficient to allow the chunks of polymer to pass the pressure differential across the sensing element is further decreased with the result that baffle 13 is moved still further from bleed orifice 15 which movement results in a further opening of valve diaphragm 32. This latter operation continues until the valve diaphragm 32 is open sufficiently to pass the chunks of polymer. As mentioned above when the chunks of polymer have passed valve 2 and the valve 2 is open to an abnormally great extent fluid flow therethrough is greater than the desired rate of fluid flow and the pressure differential across the sensing apparatus is increased under which condition diaphragm 6 is raised and valve diaphragm 32 is moved closer to its seat to restrict the flow of liquid to the rate at which the apparatus had previously been adjusted.

When polymer chunks have passed through the motor valve 2 they may likewise plug the space between diaphragm 6 and its seat thereby restricting flow at this point. When this plugging occurs the pressure differential across the sensing element increases quite rapidly and the diaphragm 6 is accordingly raised. As long as the valve diaphragm 32 is not tightly seated hydraulic pressure is exerted against the solid material plugging the sensing apparatus and the solid polymer is urged through the sensing apparatus. As soon as the sensing element is opened sufficiently and the polymer has passed the pressure differential across apparatus 3 rapidly decreases which decrease allows the diaphragm to be lowered by compression spring 9 and this movement throttles valve 2 to reestablish the predetermined rate of liquid flow.

We have found that the flow control apparatus herein disclosed operates as described in the control of a rate of flow of latex containing lumps of polymer.

If desired, the controller apparatus 5 can be a recorder controller or just an indicator controller. Modern plant construction ordinarily employs recorders wherever possible since a permanent record of rate of flow is then made.

While we have described the apparatus of our invention utilizing air pressure in the relay 4 and in the controller 5 electrically controlled and operated apparatus can be used. When using electrical apparatus the movement of the movable member 8 of the sensing element is magnified by use of a properly placed pivot point around which baffle member 13 can rotate so that the left hand end of this member will move a sufficiently great extent on an electrical resistance element to vary voltage in an electrical relay which variation of voltage regulates an electrical current to a reversible electrical motor on an electrically driven motor valve which operates a diaphragm of a valve corresponding to valve 2 herein described. Such an electrically operated valve should of course be of the throttle type and is supplied with a reversible electrical motor so that the valve can be opened as well as closed. While such electrical apparatus is a full equivalent of the pneumatic apparatus disclosed herein in detail we prefer to use the pneumatic apparatus. While under some conditions it might be permissible to employ gate or globe valves in the place of valve 2 it is necessary always to use a diaphragm apparatus as described herein for the sensing portion of the control apparatus. However, in general, the use of gate and globe valves is not recommended.

The diaphragms such as diaphragms 6 and 32 of our apparatus should be made of resilient material which will not swell or become otherwise adversely effected by the material the rate of flow of which is to be controlled. We find that synthetic elastomers in general are satisfactory for this purpose. Natural rubber diaphragm can be used for diaphragm 23 in the motor of valve 2. When the pressure equalizing tube 12 is employed it is preferable that the diaphragm 11 be made of a synthetic elastomer material similar to that employed in diaphragms 6 and 32.

The use of the pressure tube 12 is not necessary under all conditions and services and it might be omitted. Tube 12 is not used, for example, when pipe 1 downstream of the sensing apparatus 3 is discharging to the atmosphere. The tube may still be installed in the apparatus but a valve 47 is provided and this valve is closed. If however the tube 12 with its valve 47 is not installed with the apparatus the housing 27 and the diaphragm 11 therein are not required. In this case the movable member 8 extends through the support member 42 which serves as a guide for the movable member 8 and as a support for a compression spring adjuster 46.

While we have described the relay apparatus 4 and the control apparatus 5 as being a direct acting relay and a direct acting controller respectively, that is, as air pressure in tube 16 increases, the relay operates to increase air pressure in tube 20 and as air pressure in tube 20 increases air pressure in tube 22 is increased. Indirect elements such as an indirect air relay and an indirect controller can also be used. In this latter case the construction of the relay is slightly different and as the air pressure in a tube corresponding to tube 16 increases the air pressure in a tube corresponding to tube 20 decreases and as the air pressure in tube 20 decreases the air pressure in a tube corresponding to tube 22 increases to operate a motor valve corresponding to valve 2 in a manner as herein described. The use of such an indirect pneumatic relay and pneumatic controller is the full equivalent of a direct acting apparatus disclosed herein.

Another embodiment of our invention (Fig. 2) involves use of a resilient diaphragm 51 in the flow sensing element having an orifice 52 on the downstream side with respect to the direction of flow of fluid through the flow sensing element. A fluid-tight housing 53 covers the diaphragm. A fitting 57 is provided in housing 53 for inlet of purge fluid. A packing gland 54 is provided in the fluid-tight housing for accommodation of a spring loaded valve stem element 55 so that this element can move longitudinally and yet fluid will not leak therearound. This spring loaded element is intended to bias the diaphragm closed against its seat 56. In this embodiment fluid pressure from the downstream side of the constriction or diaphragm valve seat is transmitted through orifice 52 to the side of the diaphragm 51 opposite the valve seat. The orifice 52 is provided in order that the effect of downstream pressure, acting on diaphragm 51 in the same direction as the upstream pressure, is eliminated. This point is clearly shown by action of downstream pressure through orifice 52 on the side of diaphragm 51 opposite seat 56, i. e., on twice the area, and in opposition to the downstream pressure acting on half the side of diaphragm 51 facing seat 56. The net result is that the movable member 55 and the motor valve 2 are truly subject to a differential pressure. This embodiment of diaphragm 51 with orifice 52 is the equivalent of the diaphragm 11 and associated parts and is considerably less expensive to manufacture. The baffle 13 is pivoted to the valve stem element in this embodiment as it is pivoted to valve stem element 8 in Figure 1 of the drawing. The principle of operation of this embodiment is the same as for the embodiment using a separate diaphragm 11, housing 27 and tube 12 with valve 47 being open.

While certain embodiments of the invention have been described for illustrative purposes the invention obviously is not limited thereto.

We claim:

1. A fluid flow sensing apparatus comprising a first conduit, one portion of said conduit having a smaller cross section than the remainder of the conduit, the smaller cross section portion being provided with a seat for the diaphragm of a diaphragm type valve, an opening in said conduit opposite said seat, a resilient first diaphragm covering said opening fluid-tight, a spring loaded valve stem element biasing said first diaphragm in the direction of said seat, said valve stem element being radially positioned with respect to said conduit, a flexible second diaphragm attached to said valve stem element at its other end, a fluid-tight case covering the side of said second diaphragm opposite said conduit, and a second conduit communicating said first conduit on the downstream side of said valve seat as regards direction of flow of fluid through said first conduit with the space intermediate said second diaphragm and said case.

2. A fluid flow sensing apparatus comprising a conduit, one portion of said conduit having a smaller cross section than the remainder of the conduit, the smaller cross section portion being provided with a seat for the diaphragm of a diaphragm type valve, an opening in said conduit opposite said seat, a resilient diaphragm covering said opening, an orifice in said diaphragm on the downstream side of said seat as regards direction of flow of fluid, a spring loaded valve stem element biasing said diaphragm in contact with said seat, a housing covering said resilient diaphragm fluid-tight, and said spring loaded valve stem element extending through said housing in a fluid-tight manner.

3. A fluid flow sensing apparatus comprising a conduit, one portion of said conduit having a smaller cross section than the remainder of the conduit, the smaller cross section portion being provided with a seat for the diaphragm of a diaphragm type valve, an opening in said conduit opposite said seat, a resilient diaphragm covering said opening, an orifice in said diaphragm on the downstream side of said seat as regards direction of flow of fluid, a spring loaded valve stem element biasing said diaphragm in contact with said seat, a housing covering said resilient diaphragm fluid-tight, a pipe fitting in said housing for inlet of purge fluid, and said spring loaded valve stem element extending through said housing in a fluid-tight manner.

4. A fluid flow sensing apparatus comprising a first conduit, one portion of said conduit having a smaller cross section than the remainder of the conduit, the smaller cross section portion being provided with a seat for the diaphragm of a diaphragm type valve, an opening in said conduit opposite said seat, a resilient diaphragm covering said opening, a spring loaded valve stem element biasing said resilient diaphragm in the direction of said seat, an enclosed space on the side of said diaphragm opposite said seat, a second conduit communicating said first conduit on the downstream side of said valve seat as regards direction of flow of fluid through said first conduit with said enclosed space.

References Cited in the file of this patent

UNITED STATES PATENTS

| | | |
|---|---|---|
| Re. 19,151 | Saunders | May 1, 1934 |
| 1,745,059 | Rush | Jan. 28, 1930 |
| 2,076,566 | Isbell | Apr. 13, 1937 |
| 2,422,758 | Temple | June 24, 1947 |
| 2,470,452 | Ackley | May 17, 1949 |
| 2,572,175 | McPherson | Oct. 23, 1951 |
| 2,630,132 | Hughes | Mar. 3, 1953 |